United States Patent [19]

Mann, II et al.

[11] Patent Number: 5,577,186
[45] Date of Patent: Nov. 19, 1996

[54] APPARATUS AND METHOD FOR PROVIDING A GENERIC COMPUTERIZED MULTIMEDIA TUTORIAL INTERFACE FOR TRAINING A USER ON MULTIPLE APPLICATIONS

[76] Inventors: S. Edward Mann, II, 11020 Huebner Oak #1136, San Antonio, Tex. 78230; Frederic Milliot, 5 Rue Boulle 75011, Paris, France

[21] Appl. No.: 541,221

[22] Filed: Oct. 12, 1995

Related U.S. Application Data

[63] Continuation of Ser. No. 283,618, Aug. 1, 1994.
[51] Int. Cl.⁶ .................................................. G06F 9/455
[52] U.S. Cl. ................................ 395/806; 395/340
[58] Field of Search ............................... 395/154–155, 395/133, 161, 153, 157; 434/118; 364/401

[56] References Cited

U.S. PATENT DOCUMENTS

| | | | |
|---|---|---|---|
| 4,586,905 | 5/1986 | Groff | 434/307 |
| 4,637,797 | 1/1987 | Whitney et al. | 434/118 |
| 4,701,130 | 10/1987 | Whitney et al. | 434/118 |
| 4,772,206 | 9/1988 | Kerr et al. | 434/118 |
| 4,798,543 | 1/1989 | Spiece | 434/323 |
| 5,237,648 | 8/1993 | Mills et al. | 395/133 |
| 5,311,422 | 5/1994 | Loftin et al. | 364/401 |
| 5,388,993 | 2/1995 | McKiel et al. | 434/118 |
| 5,448,739 | 9/1995 | Jacobson | 395/700 |

OTHER PUBLICATIONS

Staiti, Datamation vol. 39, No. 22, Nov. 15, 1993, p. 2 (abstract only).
Microsoft Excel 5.0, Microsoft Corporation, 1994, Screen Printouts pp. 1–8.
Microsoft Works, Microsoft Corporation, 1989, pp. 7 and 30.
Whitehorn, PC User No. 221, pp. 42–44, Oct. 20, 1993 (abstract only).

*Primary Examiner*—Heather R. Herndon
*Assistant Examiner*—Stephen Hong
*Attorney, Agent, or Firm*—Bruce E. Garlick

[57] ABSTRACT

A computerized, multimedia tutorial interface system (10) and method for training a user to use computer application software. The system incorporates the training techniques of video segments, on-line tutorials, written instruction, and learning-by-doing lessons. The system and method incorporate the video segments into the system so that they may be displayed on a computer screen (26). User input is given by way of a mouse (22), keyboard (30), or by voice through an audio interface (34). Once the video clip is displayed on a video window (55), the system preferably runs a set of instructions within the computer application software to demonstrate the exact sequence of instructions that were discussed in the video clip. Once this is completed, written instruction is provided and the user is then given an opportunity to execute the same functions as previously described and executed by the system. In this fashion, lesson content is multiply reinforced. The system may also include user monitoring to ensure that the user correctly enters the instructions as well as to monitor the progress the user is making in his or her training. Preferred applications of the system and method of the present invention include application software, on-line services, and other complicated computer software systems.

12 Claims, 5 Drawing Sheets

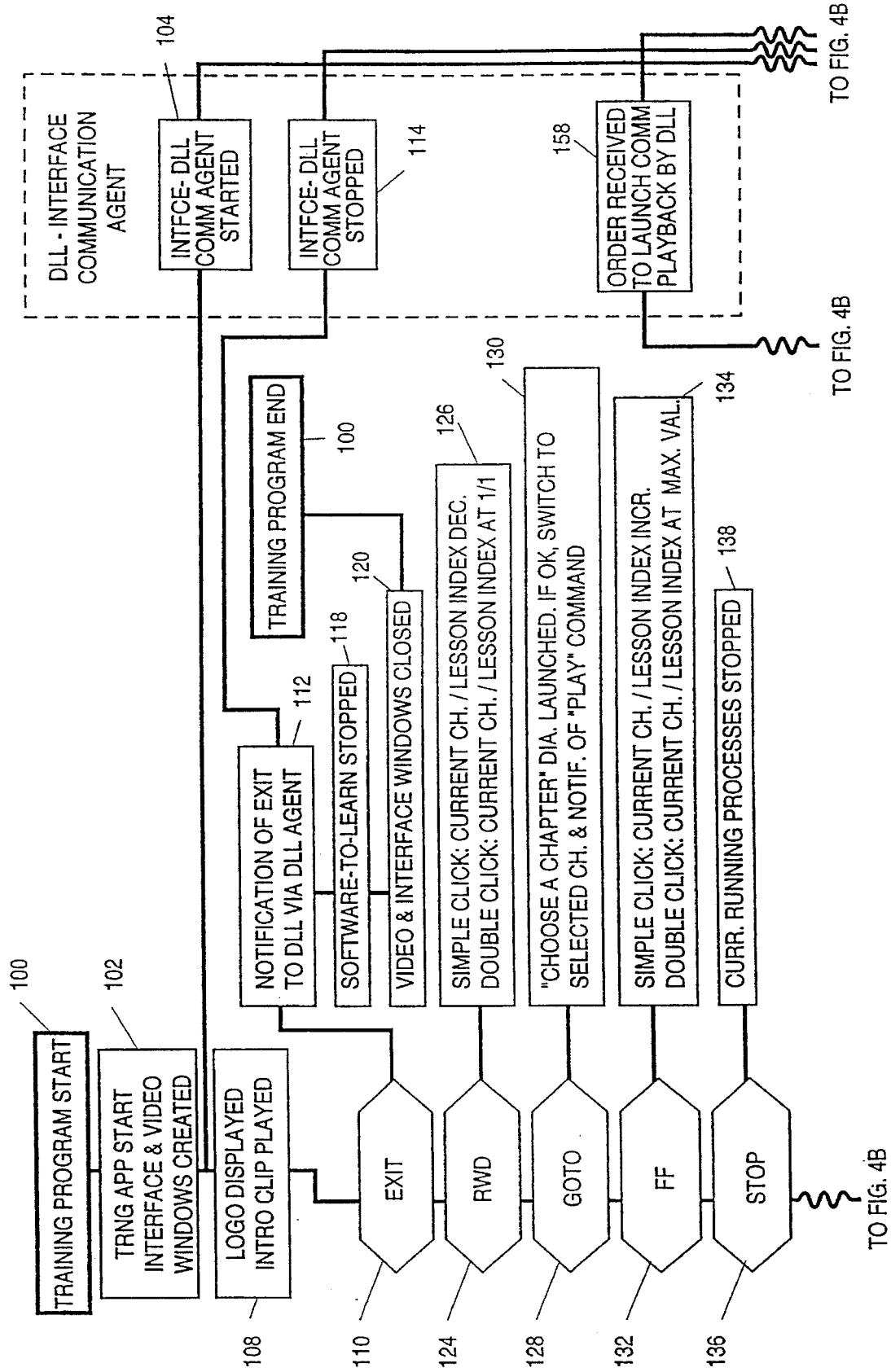

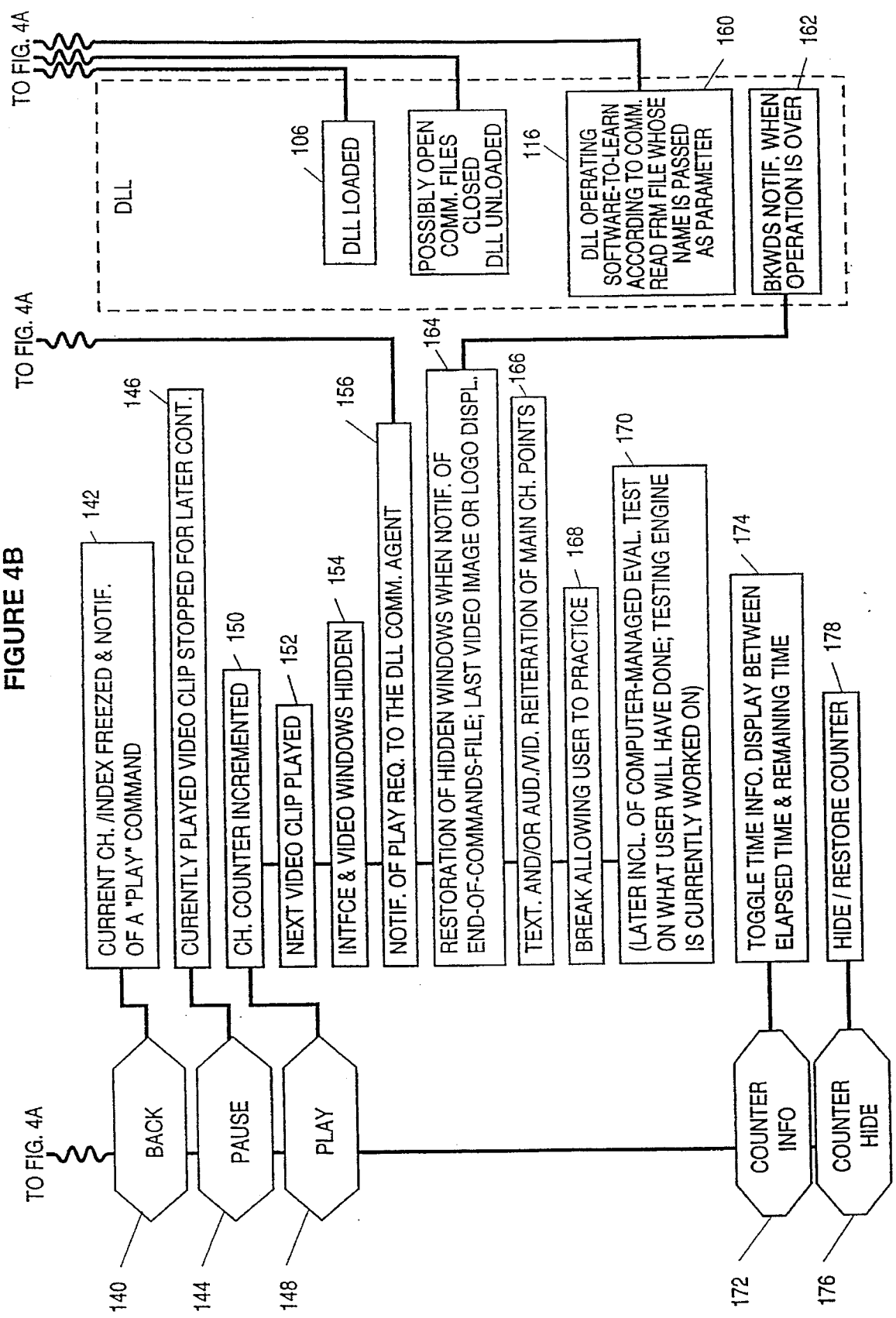

APPARATUS AND METHOD FOR PROVIDING A GENERIC COMPUTERIZED MULTIMEDIA TUTORIAL INTERFACE FOR TRAINING A USER ON MULTIPLE APPLICATIONS

This is a continuation of application Ser. No. 08/283,618, filed Aug. 1, 1994.

BACKGROUND OF THE INVENTION

This invention relates to training users of computer software. More particularly, this invention relates to a computer based system employing a multimedia approach to training users of various types of computer applications by providing audio\visual instruction along with on-line practice sessions using a multi-dimensional lesson monitoring approach.

For many years application programs, on-line services, and other computer application software have been available for use with digital computers. Application programs perform word processing functions, numeric functions, database functions, accounting functions, inventory control functions, and a wide variety of other functions. Application programs serve not only to increase the efficiency of the user but to increase the user's accuracy as well. On-line services allow a user to access large databases of information. However, when first implementing the computer application software or on-line service, a significant amount of time is required to educate the user in the use of the computer application software or information services. Not until the user is sufficiently trained in the use of the computer application software or service may substantial benefits be derived from the program or service.

The earliest approaches to training users were by the providers of computer application software. The first training tools involved written instruction books that were included with the programs. These books described the functions available in the software, how to implement the functions, and the limitations of the functions. The earliest training books were written in a highly technical manner that prevented the average user from gaining a thorough understanding of the program. Resultantly, a large industry grew around providing written training materials for training users to use the programs. Over time, with increased competition, the written materials became easier to read and understand, providing more thoughtful approaches to educating the user.

While the software industry developed, some persons and organizations recognized the shortcomings of the written book type instruction and stepped in to provide classroom and interpersonal instruction. Classroom type instruction targeted specific software that was popular enough to justify the large capital expenses associated with this type of training. Levels of instruction varied from lectures given in large auditoriums all the way down to one-on-one training sessions. While this type of instruction proved to be quite successful due to its human aspect, it was very expensive and generally required that the new user leave his or her place of employment to attend. Further, because the user generally was not provided with hands on training, and even if he or she was, the training was not performed on his or her own machine. Because of differences in machines and environments used in the training classes, the user could not always transfer the knowledge he or she had obtained to his or her own computer.

Over time, vendors of the software and others in the industry recognized the value of training the user on his or her own machine while inside the software itself. Thus, on-line tutorials were developed. On-line tutorials typically combined a written description of a particular function of the software and instruction in specific commands that would allow a user to perform the function. These on-line tutorials typically allowed a user to perform a few instructions at a time as directed by the tutorial with the instructions being monitored to ensure correctness of operation. While these on-line tutorials provided the benefit of learning while doing, they were typically difficult to follow and did not provide adequate explanation. Part of the problem related to inadequate written explanation that carried over from the user's manual was that such information was conveyed to the user only in a written format displayed on the screen. Further, because they were specific to the particular application program, they did not provide a familiar reference frame for the user and the user first had to learn to use the on-line tutorial in the particular program.

Thus, attempts were made to combine the benefits of classroom training with the benefits of hands-on training on the user's own machine. A few vendors recorded classroom training programs on video cassettes so that a user could play the lessons at his or her own speed on a nearby television while simultaneously working on the computer. Thus, a user could combine the benefits of working on his or her own machine while also obtaining the benefits of being in a classroom. Unfortunately, there was no interplay between the video being viewed and the user's commands issued to the computer application software. While this system allowed the user to play the video in his of her office, it did not provide the interactive benefits available from other techniques. Thus, the system did not reinforce the commands described in the video and required the simultaneous operation of two separate machines.

A recent visual teaching aid, sold under the tradename LOTUS SCREENCAM, displays images on a computer screen that are identical to those displayed within an application program. However, even though the teaching aid displays images that a user would encounter during use of the program, the teaching aid merely functions like a video player. The teaching aid merely displays to the user a proper sequence of keystrokes and/or mouse movements that would be required to execute specific functions and does not provide interaction between the user and the actual application program.

SUMMARY OF THE INVENTION

It is therefore a general object of the invention to overcome the above described limitations, and others, of the prior tutorial devices and methods. More particularly, it is an object of the invention to provide a computer based tutorial interface system that provides a user with audio/visual training on specific functions of a computer program or computer service, provides actual samples of the implementation of the functions, assists the user in learning to perform the function within the computer application software, and requires the user to take an active approach in the training by performing actual instructions within the application software on the user's own machine.

To accomplish these objects, a computerized, multimedia tutorial interface system for training a user to use a computer application comprises, generally, a user control interface, an audiovisual tutorial interface, and a computer application software interface. The system preferably takes the form of a software engine that performs all necessary control and interface functions between the user, a video tutorial that is displayed on the user's computer screen, and the computer application software itself. In this fashion the interface system allows a user to control the video tutorial, view an execution of program functions, and practice performing the functions of the program itself. The system resides on the user's machine so that the user may perform all of the functions at his or her leisure. In this manner, lessons learned will be imprinted fully.

Preferably, the system includes control display means, instruction input and interpretation means, audiovisual enablement means, and computer application software interface and control means. The control display means displays a control window on a computer screen through which the user may select any of a plurality of instructions using keyboard, mouse, or verbal input. As one option, the user views a video segment that describes a specific function of the computer application software. Preferably, the user may select these video segments on a chapter-by-chapter and lesson-by-lesson basis. Other functions include moving forward, backward, or searching for a particular lesson, viewing the execution of a sequence of instructions within the computer application software, and gaining control over the computer application software, among others. In this fashion, the user can control the operation of the system as desired. Responsive to the user's input, the instruction input and interpretation means receives the instruction and executes the respective command within the system.

When a video play command is selected by the user, the audiovisual enablement means receives the execution instruction, retrieves the selected audiovisual information, and displays the audiovisual information on at least a portion of a computer screen. Preferably, the audiovisual information comprises various pre-recorded tutorial video clips that describe a specific function or feature of the computer application software. Preferably, these video clips are displayed on a window on the computer screen separate from the control bar. However, at the user's option, the window could be expanded or contracted to provide a larger or smaller viewing area.

Preferably, after the video clip is displayed, the computer application software interface means interfaces with the computer application software and selectively executes the function described in the video segment so that the user may watch the particular functions that were described in the video clip execute within the computer application software. While the function that is executed will generally be the one that was previously described in an video segment, the user may also request that a specific function within the computer application software be demonstrated without first displaying the related video segment. After the user has been educated on the function by the video segment, the software demonstrates how the function is executed within the program. In this manner, the lesson has been reinforced and taught in a manner such that it may be duplicated by the user. Preferably, at this point, a synopsis and explanation of the executed commands are provided to the user.

After the system has demonstrated the computer application software function to the user and provided the user with a synopsis, the computer application software control means selectively relinquishes control of the computer application software to the user. The user may then perform the functions that were previously described in the video clip and performed by the system. Preferably, in this portion of the operation, the system will monitor the instructions executed by the user and issue an error message to the user on the computer screen if the user executes an instruction that is erroneous. Typically, a plurality of sets of "correct" instructions will be used as a guide and compared to the user's instructions. In this fashion, the system provides immediate feedback to the user.

The system of the present invention may also include evaluation means that evaluates the instructions issued by the user and issue a summary of the user's performance in issuing the instructions. In this fashion, the user's knowledge and proficiency may be gauged and reported. Further, the progress made by the user in his completion of the training may also be monitored.

The present invention also comprises a computerized method for providing a multimedia tutorial interface for training a user to use computer application software. The steps of this method parallel those described above for use of the system. The method includes steps of providing a user with an audiovisual tutorial, executing certain program functions, and allowing a user to execute the described functions. These steps are carried out in a manner analogous to the use of the system described above. The method also includes additional instructions more fully described herein.

The system and method of the present invention provide many important advantages over the prior tutorial methods and systems. Among other advantages, the system of the present invention provides, in combination, the benefits of a plurality of techniques so that the benefits may compound and reinforce each other. The present invention provides a user controllable audiovisual tutorial program that displays visual information on the user's own computer screen. Therefore, the user may selectively view any lesson in the tutorial without leaving his or her office and machine.

After the video clip has been played, the system confirms and enforces the lesson by demonstrating the function or service feature that was described in the video clip. The system demonstrates, step-by-step, the instructions required to perform the described function or service feature. Therefore, the user is instructed exactly how to perform the function described in the video. Because these instructions are demonstrated as performed within the computer application software itself, the environment is exact, and no translation of techniques is required.

The system also allows the user to practice the commands that were described immediately after they were performed by the system. This reinforcement ensures that the user has mastered the function described. Because the system and method of the present invention combines the benefits of varied other approaches it more effectively tutors the user. Further, because the program provides the same user interface, independent of the computer application software it is teaching, it provides the user with a familiar point of reference. And, because the user operates the system completely from his or her own machine, training time is minimized. Further, individual retention of knowledge is maximized through the self-paced interaction with the particular software or service provided by the system.

Because the system of the present invention provides a generic interface to any computer application software, the system may be used to teach users of on-line services in the use of the services as well as many other computer applications. Further, even though the system is generic, it could even be embedded in a particular software program to provide a specific interface. Thus, the system has great flexibility and adaptability in its application.

These and other objects, advantages, and features of the invention will be apparent from the following description of the preferred embodiments, considered along with the accompanying drawings.

BRIEF DESCRIPTION OF THE DRAWINGS

FIGS. 4A and 4B are sample display screen view detailing a visual interface of the embodiment of the present invention disclosed in FIG. 2.

NOMENCLATURE AND DEFINITIONS

Figure 1:
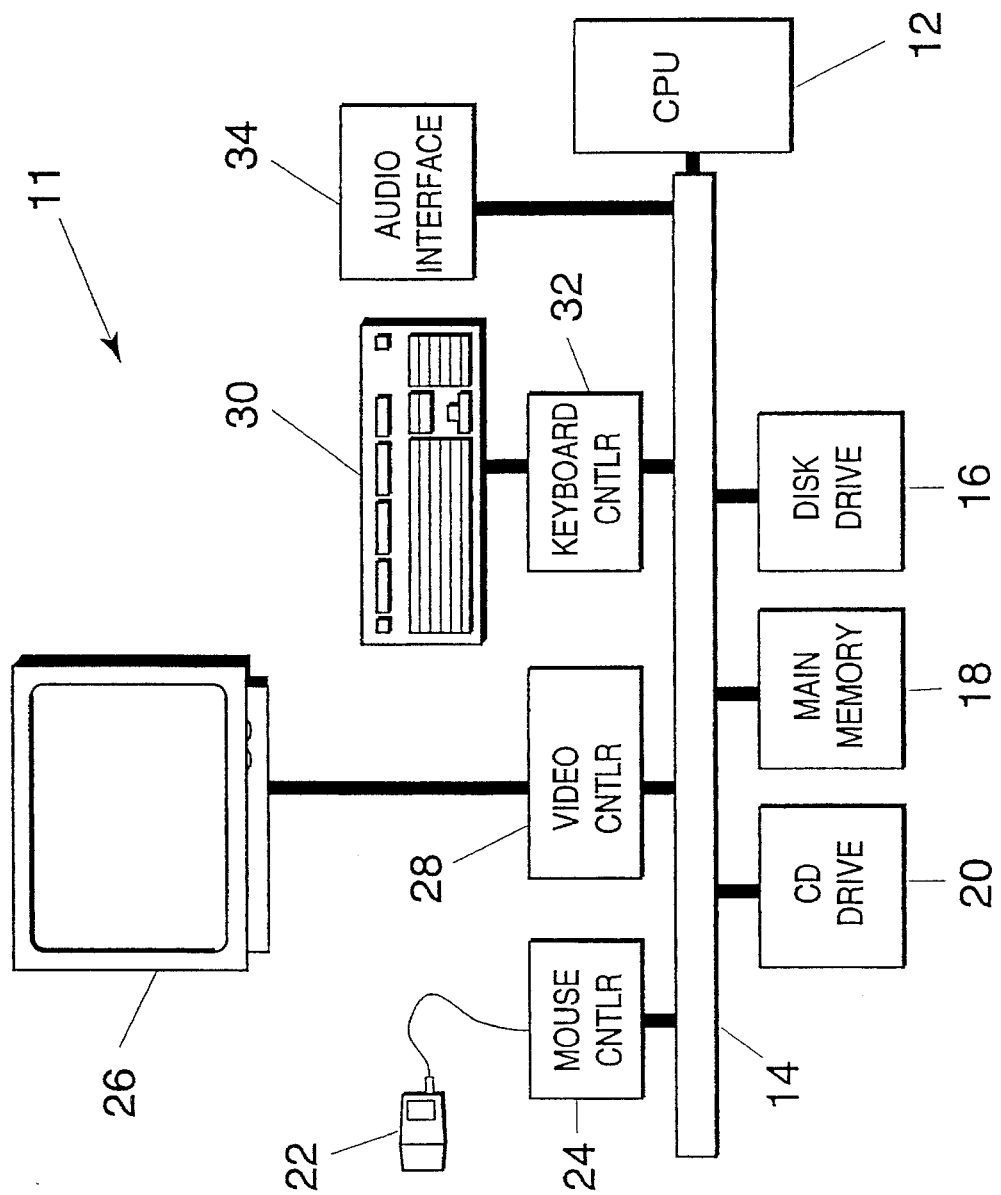
FIG. 1 is a functional block diagram of a computer utilized in conjunction with the present invention.

The descriptions which follow are presented in part in terms of algorithms and symbolic representations of operations within a computer. These descriptions and representations are the means used by those skilled in the software arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as, values, symbols, characters, display data, terms, numbers, or the like. It should be borne in mind, however, that all of these and similar terms are to be associated with the appropriate physical quantities and are merely used here as convenient labels applied to these quantities.

Further, the manipulations performed are often referred to in terms, such as comparing, commonly associated with mental operations performed by a human operator. No such capability of a human operator is necessary, or desirable in most cases, in any of the operations described herein which form part of the present invention, since the operations are machine operations. Useful machines for performing the operations of the present invention include general purpose digital computers or other similar devices. The present invention relates to method steps and apparatus for operating a computer in processing electrical or other physical signals to generate other desired physical signals.

The present invention also relates to a system for performing these operations. This system may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

In the following description, several terms are used frequently, have specialized meanings in the present context, and are thus defined. The terms "environment", "windowing environment" and "running in windows" are used interchangeably to denote a computer user interface in which information is manipulated and displayed within bounded regions on a raster scanned video display.

The terms "application", "computer application software", and "program" are used interchangeably herein to refer to any computer program run in conjunction with the present inventive system. Such computer programs could relate to computer applications, with on-line services, communication systems, or any other computer oriented function.

The term "current" is sometimes used herein as an antecedent to "window", "application", etc., and is used to denote system components which are currently being utilized or performing operations with respect to a particular computer application software running in the environment.

DESCRIPTION OF THE PREFERRED EMBODIMENTS

In the following description, certain details are set forth to provide a complete understanding of the present invention. It will be apparent to one skilled in the art, however, that these specific details are not required in order to practice the present invention. Also, well known electrical structures and circuits are depicted in block diagram form so as not to obscure the present invention unnecessarily.

A system 10 embodying the principles of the present invention is shown by way of illustration in FIGS. 1–4. The system 10 of the present invention is implemented on a typical computer system 11 as shown in FIG. 1. This computer system 11 typically comprises a CPU 12, a computer bus 14, a disc drive 16, main memory 18, a compact disc drive 20, and user interface components. These user interface components preferably comprise a mouse 22 and mouse controller 24, a video display 26 and video display controller 28, and a keyboard 30 and keyboard controller 32. Preferably, the computer system 11 also includes an audio interface 34 that transmits audio information to and receives audio information from a user of the system.

As one skilled in the art will appreciate, the system and method of the present invention are implemented on the computer system 11 but are not readily identifiable as specific components of the system. Those skilled in the art will readily understand how the described invention may be implemented on any of a variety of computer systems. Therefore, the implementation of the system on a particular hardware platform will not be more fully described herein.

Figure 2:
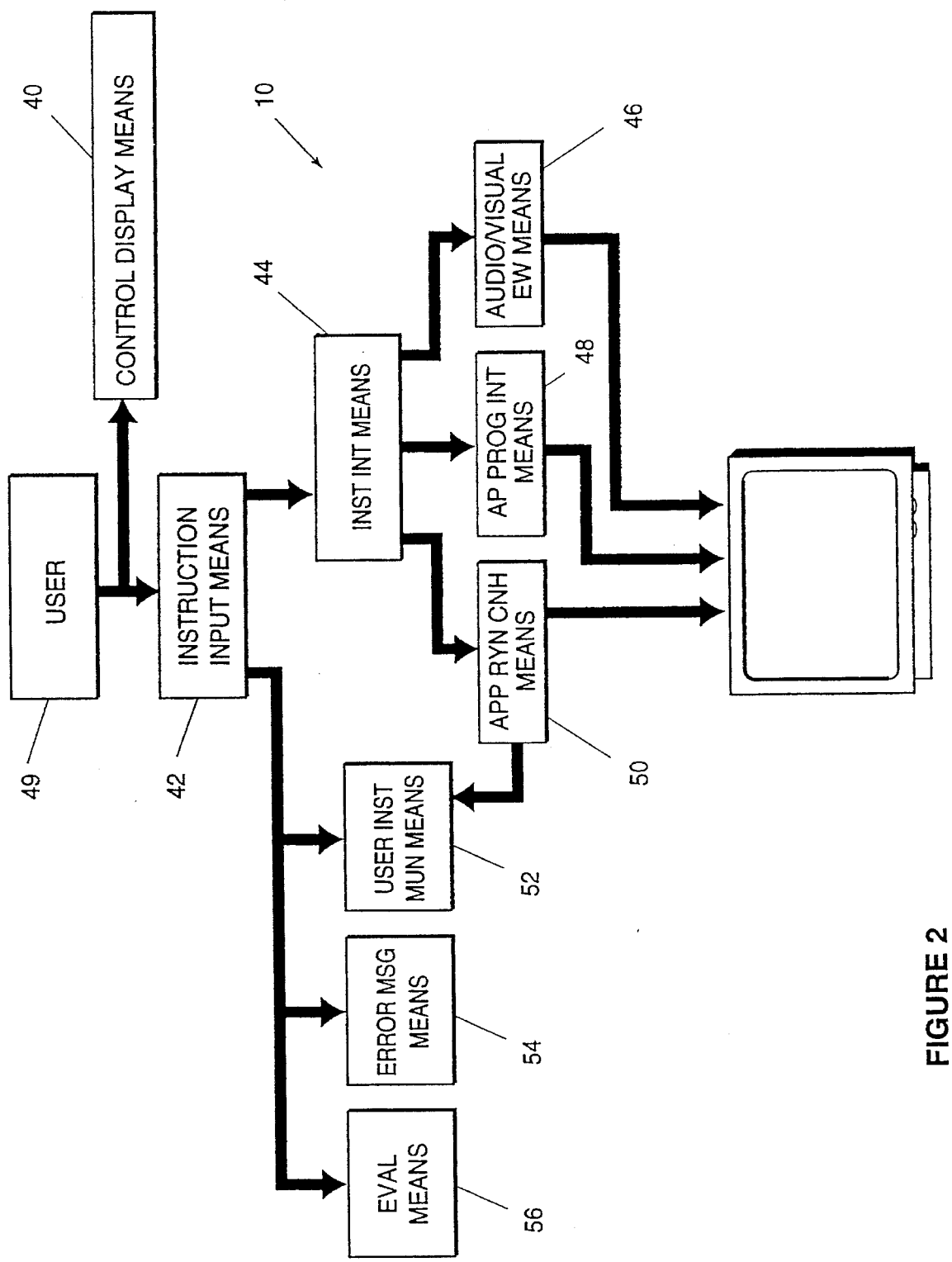
FIG. 2 is a functional block diagram showing the functional relationship between the components of a system embodying the principles of the present invention.
Figure 3:
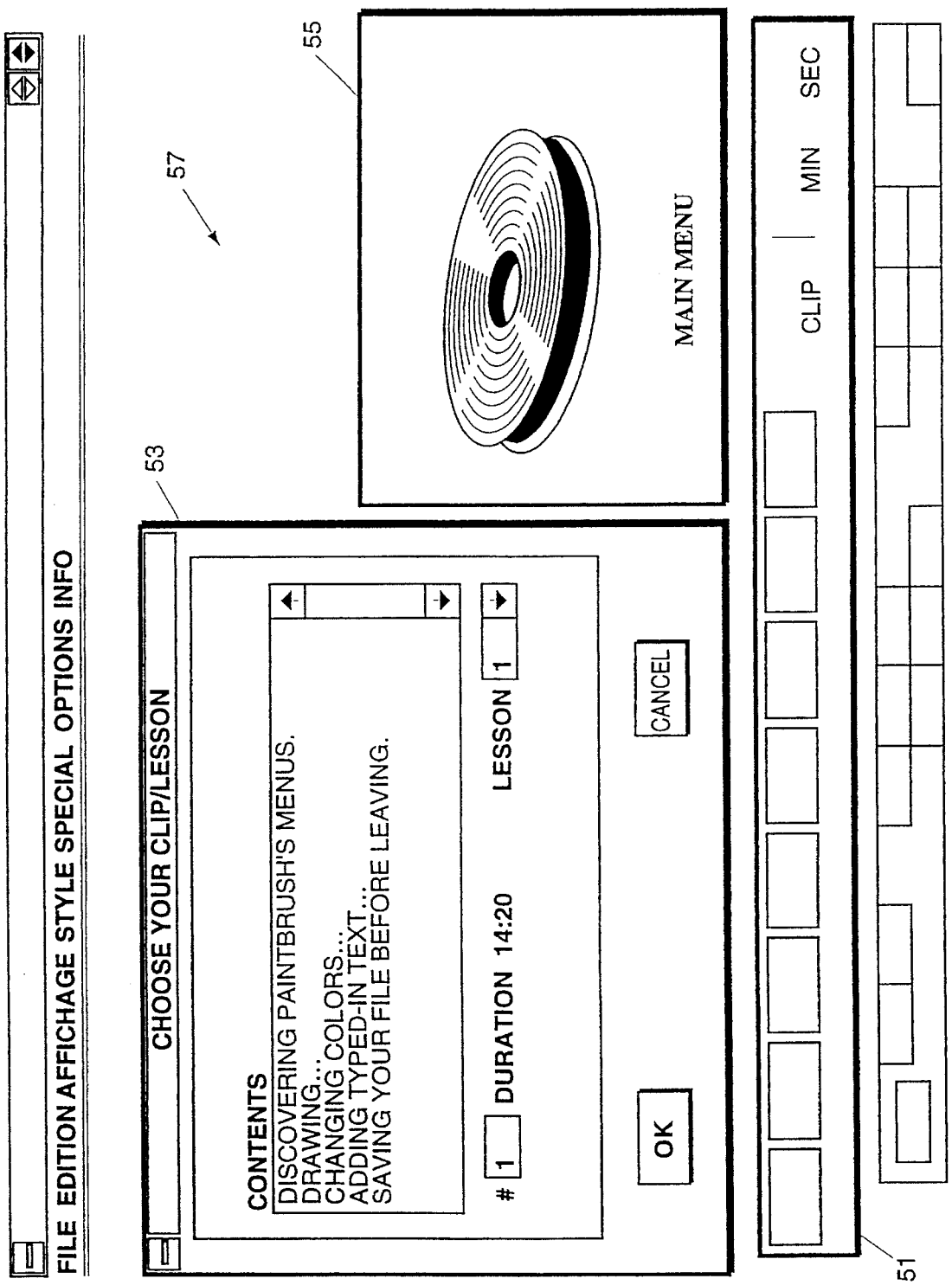
FIG. 3 is a functional flow chart detailing the operation of the system of FIG. 2.

Referring now to FIGS. 2 through 4, a computerized, multimedia tutorial interface system 10 for training a user to use computer application software comprises control display means 40, instruction input means 42, instruction interpretation means 44, audiovisual enablement means 46, computer application software interface means 48, and computer application software control means 50.

Referring specifically to FIGS. 2 and 3, the control display means 40 comprises a control bar 51 and a chapter/lesson selection screen 53, each of which are selectively displayed on the computer screen 26. Together, the control bar 51 and the chapter/lesson selection screen 53 provide a plurality of instructions to a user that may be selected by the user. As is shown, the control bar 51 preferably has commands similar to those found on a video tape player, including exit, rewind, goto, fast forward, stop, back, pause, and play. The chapter/lesson selection screen 53 allows a user to access video segments relating to specific lessons to be learned. Typically the user accesses specific video segments on a chapter-by-chapter and lesson-by-lesson basis as desired. In the preferred embodiment, the chapter/lesson selection screen 53 is displayed only when certain commands are executed via the control bar 51. However, depending upon the application, the chapter/lesson selection screen 53 could also be continuously displayed.

The instruction input means 42 operates to receive an instruction from a user 49. Preferably, the instruction input means 42 combines hardware and software components. In the preferred embodiment of the present invention, the instruction input means 42 comprises the combination of the mouse 22, the keyboard 30, the control bar 51, the chapter/lesson selection screen 53, and related software that allows the user 49 to select a desired function. Selecting a command from a menu displayed on a computer screen 26 using a mouse 22 and via a keyboard 30 are both well known in the art and are not fully described herein. As one skilled in the art will readily appreciate, however, the instruction input means 42 could also include the combination of the audio interface 34 in conjunction with voice recognition software.

The instruction interpretation means 44 interprets the user instruction, creates at least one execution instruction, and selectively issues the execution instruction. The instruction interpretation means 44 preferably comprises a series of software instructions executed on the computer system 11 in a fashion well known in the art. For example, when the user selects an instruction via the instruction input means 42, software code monitors the mouse controller 24 and keyboard controller 32 interfaces, receives input from the interfaces, processes the input to determine what function has been executed, and issues the proper execution instruction to the respective system component.

Still referring to FIGS. 2 and 3, the audiovisual enablement means 46 operates to receive execution instructions from the instruction input means 44, to selectively retrieve audiovisual information responsive to the execution instruction, and to display the audiovisual information on the computer screen 26. Preferably, the audiovisual information comprises a video clip that is retrieved from a compact disc via the CD drive 20. The video clip is then decoded, formatted, and displayed on the computer screen 26 in a video window 55. The video window 55 may cover only a portion of the computer screen 26 or may be expanded to be as large as the screen. Preferably, as is shown in FIG. 3, the video window 55, the control bar 51, and the chapter/lesson selection screen 53 all reside on top of the computer application software window 57 when they are active. However, when they are inactive, they are all hidden. Further, in the preferred embodiment the chapter/lesson selection screen 53 is displayed only when certain user instructions are executed.

In a typical use of the tutorial interface system, the user 49 selects a specific video clip that corresponds to a particular chapter and lesson to be learned. The video clip is then retrieved and displayed on the computer screen 26 in the video window 55. After the information has been displayed, and if the process has not been aborted or otherwise interrupted by the user, control may be returned to the user or be given to another system 10 component. In the preferred embodiment, immediately after the video clip has been displayed, or during a user 49 initiated break in the video clip, control is taken again by the computer application software interface means 48. However, the system 10 may also be operated such that the computer application software interface means 48 takes control during a video clip, halts the video clip to demonstrate a function or service feature, and then later restarts the video clip.

The computer application software interface means 48 also receives execution instructions from the instruction interpretation means 44. The computer application software interface means 48 interfaces directly with computer application software and selectively executes a function of the computer application software that is described in a video clip. Thus, the functions performed by the computer application software interface means 48 within the computer application software provides a second visual training tool to the user 49 on the computer display 26. Preferably, the function or set of functions executed within the computer application software relate directly to the audiovisual segment that was just displayed to the user 49. Preferably, the computer application software interface means 48 comprises a dynamic link library (DLL) interface communication agent that is loaded into main memory at system 10 startup. The DLL interface communication agent accesses instruction sets specific to the computer application software of interest that are stored in separate files on the disc drive 16. Thus, to perform a specific set of instructions within the computer application software, the DLL interface communication agent brings the computer application software up on the computer display 26, accesses the instructions, and then executes the instructions within the computer application program.

The computer application software control means 50 selectively relinquishes control of the computer application software to the user 49 so that the user may practice operating the computer application software. The computer application software control means 50 also selectively regains control of the computer application software from the user 59. In this fashion, the user may practice those techniques that were previously described to him via the video clip and also were performed by the computer application software interface means 48. As one skilled in the art will readily appreciate, the computer application software control means 50 is preferably implemented as a combination of software instructions.

Preferably, the system 10 of the present invention also comprises user instruction monitoring means 52, error message issuance means 54, and evaluation means 56, all of which provide feedback to the user when the user has control of the computer application software. Specifically, the instruction monitoring means 52 monitors the user instructions issued to the computer application software, keeping track of the instructions. When activated, the error message issuance means 54 issues an error message to the user on the computer screen 26 if the user issues instructions that are erroneous. To determine whether the issued instructions are erroneous, the error message issuance means 54 compares the user's issued instructions to a list of correct instructions. Further, when activated, the evaluation means 56 evaluates the instructions issued to the computer application software by the user and issues a summary of the user's performance in issuing the instructions. Thereby, the evaluation means 56 provides an indication of the user's performance in learning to use the computer application software. As one skilled in the art will readily appreciate, the user instruction monitoring means 52, error message issuance means 54, and evaluation means 56 are all preferably implemented as a combination of software instructions and executed accordingly.

Referring specifically to FIG. 4, the operation of the tutorial interface system 10 is described. In the description of the system 10 operation, each relevant system event is identified with a numeral in parentheses. Immediately after the system 10 is started (100), the interface with the computer application software is initiated and the control bar 51 and video window 55 are created (102). Next, the interface between the main program and the DLL is established (104)

and the DLL interface communication agent is loaded into main memory 18. At this point, the product logo is displayed and an introduction video segment may be played (108) on the computer screen 26. The system 10 then prompts the user to enter an instruction from the control bar 51. Immediately upon entering the program a chapter index is set to a predetermined value and a lesson index is also set to a predetermined value. When the program is run for the first time, these two indexes are set at one. However, when the user 49 continues with a previously started lesson, the indexes may be automatically set to those of the prior session.

Each instruction available on the control bar 51 may be executed by the user 49. The EXIT instruction (110) provides notification of an exit to the DLL via the DLL communication agent (112), stops the DLL communication agent (114), and closes all DLL command files (116). The EXIT instruction (110) further shuts down the core program (118), closes the control bar 51 window, the chapter/lesson selection screen window 53, and the video window 55 (120), and ends the training session (122).

Executing the REWIND (RWD) instruction (124) with a double click causes the current lesson index and the current chapter index, as displayed in the chapter/lesson selection screen window 53, to index to the first chapter and first lesson (126). Executing the REWIND (RWD) instruction with a single click causes the current chapter index to decrement by a single chapter (126).

Executing the GOTO instruction (128) opens the chapter/lesson selection screen 53 and allows the user to select a particular chapter and lesson to be indexed (130). Then the user 49 has the option of playing the video clip or the demonstration of the particular lesson. Depending upon the option selected, the video clip plays or the demonstration plays (130).

Executing the FAST FORWARD (FF) instruction (132) with a double click causes the current lesson index and the current chapter index, as displayed in the chapter/lesson selection screen window 53, to index to the last chapter and last lesson (134). Executing the FAST FORWARD (FF) instruction (132) with a single click causes the current chapter index to increment by a single chapter (134).

Executing the STOP instruction (136) causes the process that is running when the instruction is executed to stop immediately (138). Executing the BACK instruction (140) freezes the current chapter and lesson indexes and plays the previously viewed video clip again (142). The PAUSE instruction (144) causes the currently playing video clip, if one is playing, to stop for later continuation (146).

The PLAY instruction (148) first causes the chapter counter to increment (150). The chapter counter indexes the relevant video clip and DLL instructions. The next video clip is then played in the video window 55 (152). Then, the control bar 51 and the video window 55 are hidden and the DLL instructions may be executed (154). A notification of play is transmitted to the DLL interface communication agent (156), the order is received by the DLL interface communication agent (158), and instructions are read from the DLL library and executed within the computer application software (160). Once the instructions are completed, a backwards notification is sent (162) so that the control bar 51 and the video window 55 are again displayed (164). Next, a short, written synopsis of the demonstration that was executed is displayed to the user 49 on the computer screen 26 (168). Then, the computer application software interface means 48 allows the user to practice within the computer application software to enforce what he or she has learned (168). Then, the user's performance is evaluated (170).

The COUNTER INFO instruction (172) toggles the time information displayed between elapsed time from the start of the video clip to the time remaining in the video clip (174). Optionally, the counter could also display the time since the user 49 logged on or the clock time. The counter hide instruction (176) toggles the counter display between being hidden or displayed (178).

The system 10 of the present invention can be easily implemented with application programs, on-line services, or any computer application software. The system 10 is generic and provides a familiar training interface that can be used in many varied situations. As one skilled in the art will readily appreciate, the system 10 of the present invention is readily transportable to provide tutorial instruction in any computer based system.

The present invention also includes a computerized, multimedia tutorial interface method for training a user to use computer application software. The method is analogous to the previously described system and is not described to the same extent. With reference to the FIGURES, the method of the present invention comprises as a first step displaying a control window 51 and 53 on a computer screen 26. As previously described, the control window provides a plurality of instructions to a user 49 that may be selected by the user.

A next step is receiving a user instruction from a user 49. Once the instruction is received the steps of interpreting the user instruction to creating an execution instruction are received. Once created, the steps of issuing the execution instruction and receiving the execution instruction are performed.

Responsive to the execution instruction, one of three separate steps is performed. A first step is selectively retrieving audiovisual information responsive to the execution instruction. A second step is displaying the audiovisual information on at least a portion of a computer screen 26. And a third step is selectively executing a function of the computer application software that is described in the audiovisual information.

A further step is selectively relinquishing control of computer application software to a user. This allows the user to practice the skills he has learned. A final step includes selectively regaining control of the computer application software from the user.

The method of the present invention also preferably includes the steps of monitoring user instructions issued to computer application software by a user. Another additional step is issuing an error message to a user on a computer screen if a user issues an instruction to computer application software that is erroneous as compared to a list of correct instructions. Further additional steps are evaluating the instructions issued to computer application software by a user and issuing a summary of the user's performance in issuing the instructions.

As one skilled in the art will readily appreciate, the method of the present invention could be used in a wide variety of systems. Whenever training of a user is required, the method of the present invention could be employed. While specific applications of this method involve application programs, the method could also be used with other computer based services such as on-line services.

The above described preferred embodiments are intended to illustrate the principles of the invention, but not to limit the scope of the invention. Various other embodiments and modifications to these preferred embodiments may be made by those skilled in the art without departing from the scope of the following claims.

We claim:

1. A computerized, multimedia tutorial interface system for training a user to use any of a plurality of independently executable computer application software programs, the system comprising:

(a) computer application program selector, wherein the computer application software program selector receives an instruction from a user and causes the computerized, multimedia tutorial interface system to select a computer application software program from the plurality of independently executable computer application software programs;

(b) control display means for displaying a control window on a computer screen, the control window providing a plurality of instructions to a user that may be selected by the user, wherein the instructions include instructions for displaying audiovisual images describing operations of the selected computer application software program;

(c) instruction input means for receiving a user instruction from a user;

(d) instruction interpretation means for receiving the user instruction from the instruction input means, for interpreting the user instruction based upon the selected computer application software program to generate an execution instruction, and for selectively issuing the execution instruction to element (e), (f) or (g) based upon the user instruction;

(e) audiovisual enablement means for receiving an execution instruction from the instruction interpretation means, for selectively retrieving audiovisual information responsive to the execution instruction, and for displaying the audiovisual information on at least a portion of a computer screen, wherein the audiovisual information includes audiovisual images describing operations of the selected computer application software program;

(f) computer application software interface means for receiving an execution instruction from the instruction interpretation means, for interfacing with the selected computer application software program, and for issuing simulated user input to the selected computer application program to execute a function of the selected computer application software program that is described in the audiovisual image; and (g) computer application software control means for receiving an execution instruction from the instruction interpretation means, for causing the computerized, multimedia tutorial interface system to completely relinquish control to the computer application software program to allow a user to execute functions within the computer application software program, and for causing the computerized, multimedia tutorial interface system to gain control from the computer application software program based upon user input.

2. The computerized, multimedia training system of claim 1 further comprising:

(a) user instruction monitoring means for monitoring user instructions issued to the instruction input means by a user.

3. The computerized, multimedia training system of claim 2 further comprising:

(a) error message issuance means for issuing an error message to a user on a computer screen if the user issues a user instruction to the instruction input means that is erroneous as compared to expected instructions.

4. The computerized, multimedia training system of claim 1 further comprising:

(a) evaluation means for evaluating the user instructions issued to the instruction input means by a user and for issuing a summary of the user's performance in issuing the user instructions.

5. The computerized, multimedia training system of claim 1 wherein the control display means comprises a display bar having commands selected from a group of commands including at least exit, rewind, goto, fast forward, stop, back, pause, and play.

6. The computerized, multimedia training system of claim 1 wherein the audiovisual information is displayed in a window on a computer screen adjacent to, and not overlying, the control window.

7. A computerized, multimedia tutorial interface method for training a user to use any of a plurality of independently executable computer application software programs, the method comprising the steps of:

(a) displaying a list of the plurality of independently executable computer application software programs to a user;

(b) receiving a software application program selection instruction from the user and, based upon the software application program selection instruction, selecting an application software program from the plurality of independently executable computer application software programs;

(c) displaying a control window on a computer screen, the control window providing a plurality of instructions to a user that may be selected by the user, wherein the instructions include instructions for displaying audiovisual images describing operations of the selected computer application software program;

(d) receiving a user instruction from a user;

(e) based upon the selected computer application software program, interpreting the user instruction to generate an execution instruction;

(f) based on the execution instruction and the selected computer application software program, selectively retrieving audiovisual information;

(g) based on the execution instruction, displaying the audiovisual information on at least a portion of a computer screen, wherein the audiovisual information includes audiovisual images describing operations of the selected computer application software program;

(h) based on the execution instruction, executing a function of the computer application software program that is described in the audiovisual information by issuing simulated user input to the selected computer application software program;

(i) based on the execution instruction, completely relinquishing control to the selected computer application software program to allow a user to execute functions within the selected computer application software program; and (j) based on user input, regaining control from the selected computer application software program.

8. The computerized, multimedia training method of claim 7 further comprising the step of:

(a) monitoring user instructions issued by a user.

9. The computerized, multimedia training method of claim 8 further comprising the step of:

(a) issuing an error message to a user on a computer screen if a user issues a user instruction that is erroneous as compared to reference user instructions.

10. The computerized, multimedia training method of claim 7 further comprising the steps of:

(a) evaluating the user instructions issued by a user; and (b) based upon the user instructions issued by the user, issuing a summary of the user's performance in issuing the user instructions.

11. The computerized, multimedia training method of claim 7 wherein the step of displaying a control window on a computer screen includes displaying on a control bar commands selected from a group of commands including at least exit, rewind, goto, fast forward, stop, back, pause, and play.

12. The computerized, multimedia training method of claim 7 wherein in the step of displaying the audiovisual information on at least a portion of a computer screen, the audiovisual information is displayed in a window on a computer screen adjacent to, and not overlying, the control window.

* * * * *